United States Patent [19]
Takita

[11] Patent Number: 5,269,824
[45] Date of Patent: Dec. 14, 1993

[54] AIR FILTERING DEVICE

[75] Inventor: Kouichi Takita, Tokyo, Japan

[73] Assignee: NEC Corporation, Tokyo, Japan

[21] Appl. No.: 36,834

[22] Filed: Mar. 25, 1993

[30] Foreign Application Priority Data

Mar. 26, 1992 [JP] Japan .................................. 4-100412

[51] Int. Cl.[5] ........................................... B01D 46/10
[52] U.S. Cl. ...................................... 55/493; 55/385.1; 55/385.6; 55/471; 55/472; 55/497; 55/511; 55/514
[58] Field of Search ................. 55/385.1, 385.2, 385.6, 55/467, 471, 472, 493, 494, 495, 497, 508, 511, 514, DIG. 31

[56] References Cited

U.S. PATENT DOCUMENTS

3,747,773  7/1973  Jackson ............................. 55/514 X
4,385,911  5/1983  Popeil et al. ....................... 55/472 X
4,684,510  8/1987  Harkins ........................... 55/385.6 X
5,059,224  10/1991  Kikkawa et al. ............... 55/385.2 X
5,223,011  6/1993  Hanni ................................. 55/493 X Primary Examiner—Charles Hart
Attorney, Agent, or Firm—Sughrue, Mion Zinn Macpeak & Seas

[57] ABSTRACT

A generally flat air filtering device for an optical disk drive is disclosed. As air is sucked into the disk drive via an inlet of a filter, a filter mat included in the filter removes dust and other impurities from the air. The purified air comes out of the outlet of a tube and then enters and cools an optical disk unit. The filter mat has a generally V-shaped section and, therefore, has a filtering area great enough to enhance efficient dust collection as well as the service life of the filter. To isolate the purified air from surrounding dust-containing air, an endless projection or rail is provided on the tube to bite into the filter mat which is flexible.

5 Claims, 10 Drawing Sheets

AIR FILTERING DEVICE

BACKGROUND OF THE INVENTION

The present invention relates to a generally flat air filtering device applicable to an optical disk drive.

It is a common practice with an optical disk drive to cool an optical disk unit and other units incorporated in the casing of the disk drive by a fan. A filter is also incorporated in the casing for removing dust and other impurities from air being sucked into the casing. The resulting purified air flows in the entire casing of the disk drive to cool the disk unit. This is undesirable since cooling all the units built in the disk drive reduces the cooling effect available for the disk unit. Moreover, since even the other units which do not have to be cooled by the purified air are cooled by the purified air, a considerable amount of cooling air and, therefore, a bulky filter is needed. A bulky filter allows dust floating outside the disk drive to enter the disk drive via small clearances existing in the casing of the disk drive, e.g., an air inlet and a filter frame portion, contaminating the disk unit.

SUMMARY OF THE INVENTION

It is, therefore, an object of the present invention to provide an air filtering device capable of surely and efficiently preventing dust and other impurities from entering an optical disk drive.

In accordance with the present invention, an air filtering device comprises a body having an air inlet at one end and an air outlet at the other end, a filter having a generally V-shaped section and removably set in the body with an opening thereof located at the same position as the air inlet of the body, the filter comprising a flat filter mat having a generally V-shaped section, filter frame members attached to opposite sides of the filter mat which are parallel to the V-shaped section, and a frame member affixed to the opening of the filter mat for allowing the filter mat to be removably attached to the body, an endless projection extending from the inner periphery of the body adjacent to the air inlet toward the filter mat and support portions provided on the inner periphery of the body for supporting the filter frame members.

Also, in accordance with the present invention, an air filtering device comprises a body having an air inlet at one end and an air outlet at the other end, a filter having a generally V-shaped section and removably set in the body with an opening thereof located at the same position as the air inlet of the body, the filter comprising a flat filter mat having a generally V-shaped section, filter frame members attached to opposite sides of the filter mat which are parallel to the V-shaped section, and a frame member affixed to the opening of the filter mat for allowing the filter mat to be removably attached to the body, an endless projection extending from the inner periphery of the body adjacent to the air inlet toward the filter mat, a support member located at two positions in the body to extend along the filter frame members for supporting the filter frame, and a straight projection associated with the support members to extend in an intended direction of insertion of the filter.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
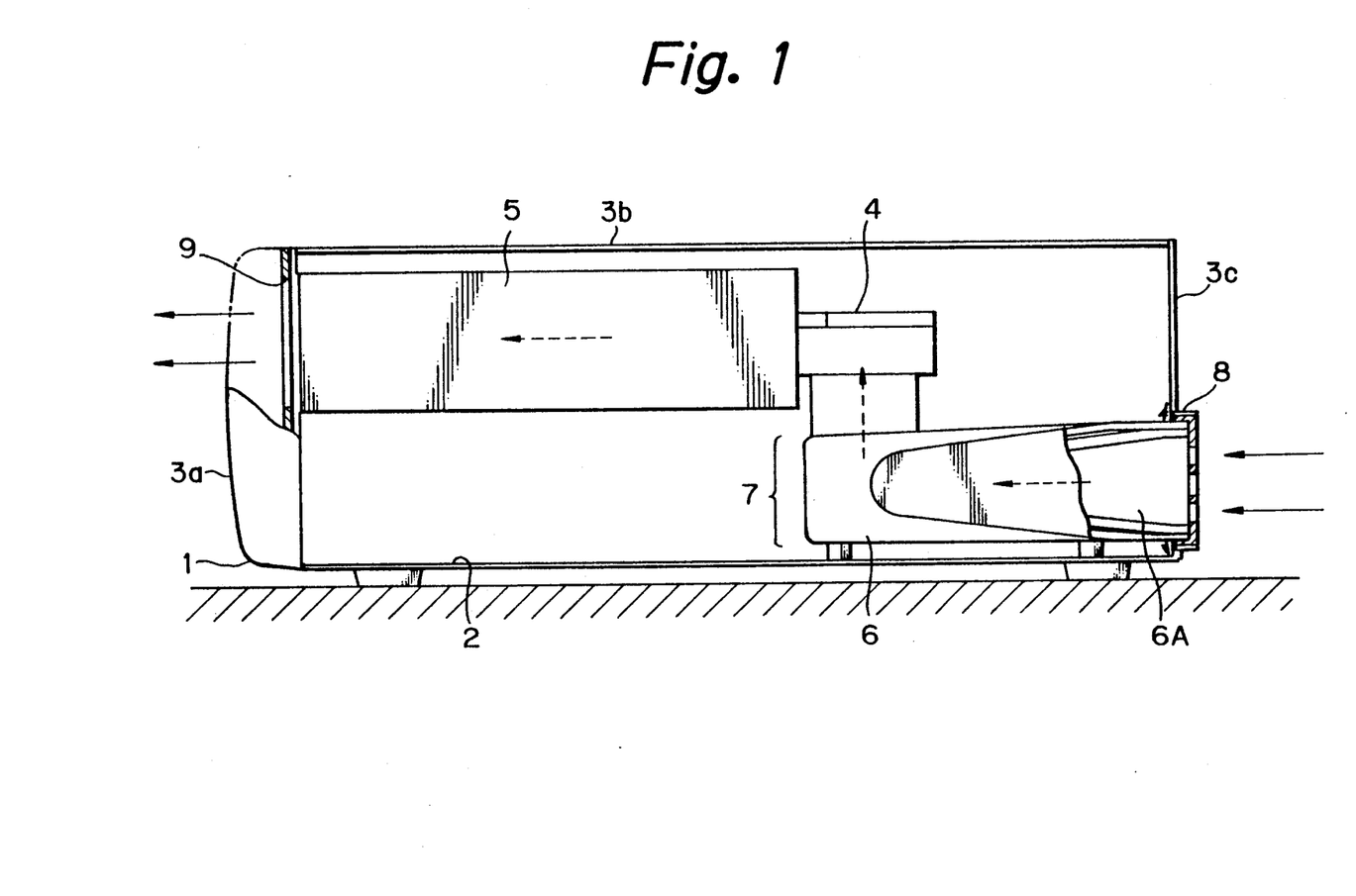
FIG. 1 is a section showing an air filtering device embodying the present invention.
Figure 2:
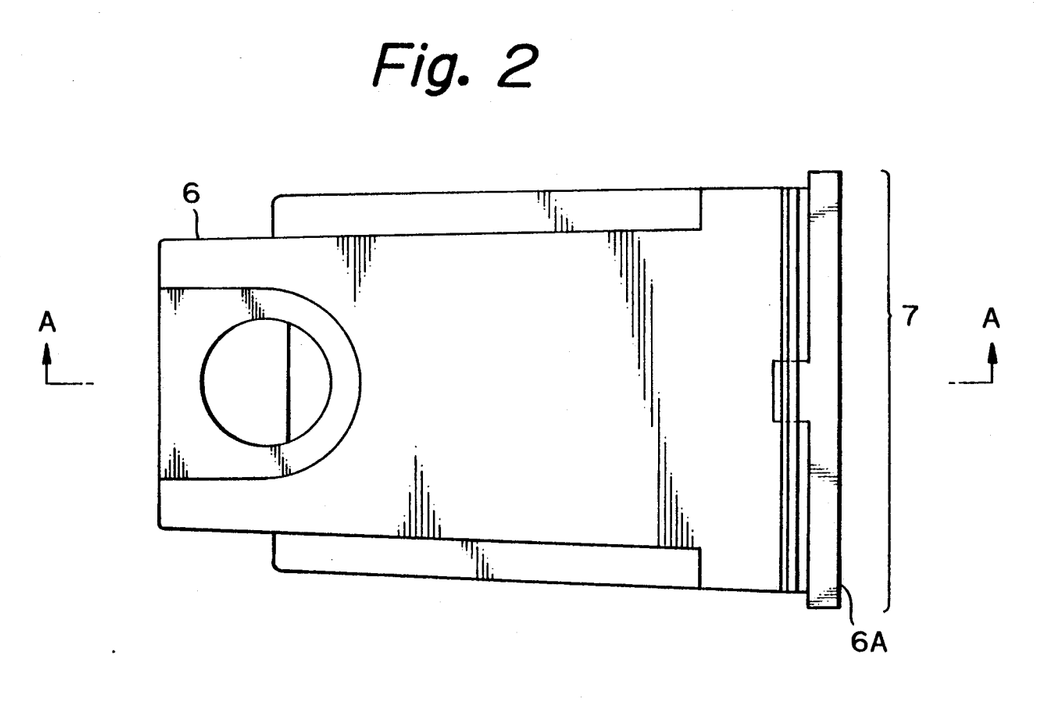
FIG. 2 is a plan view of a filter and a tube included in the embodiment.
Figure 3:
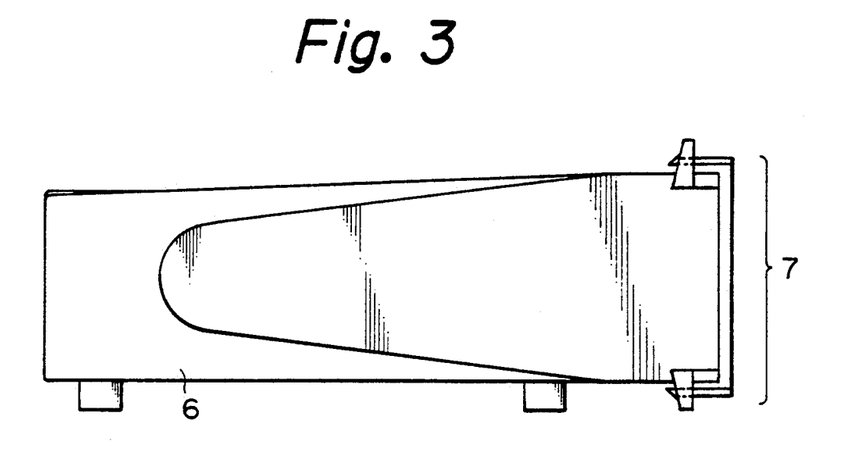
FIG. 3 is a front view of the filter and tube.
Figure 4:
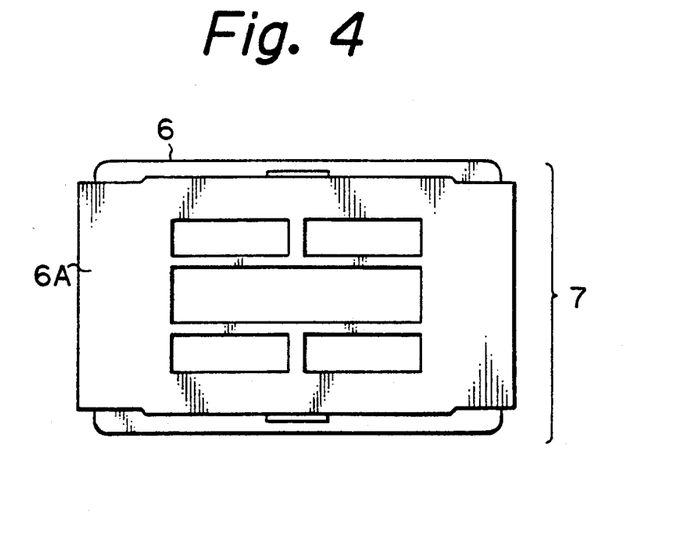
FIG. 4 is a side elevation as viewed from the right-hand side of FIG. 3.
Figure 5:
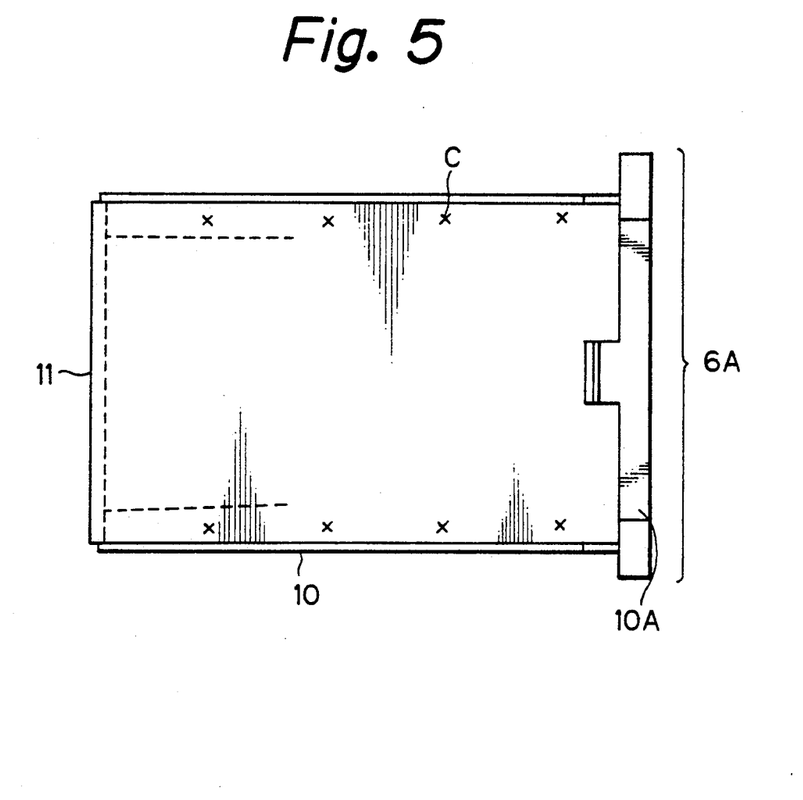
FIG. 5 is a plan view of the filter of the embodiment.
Figure 6:
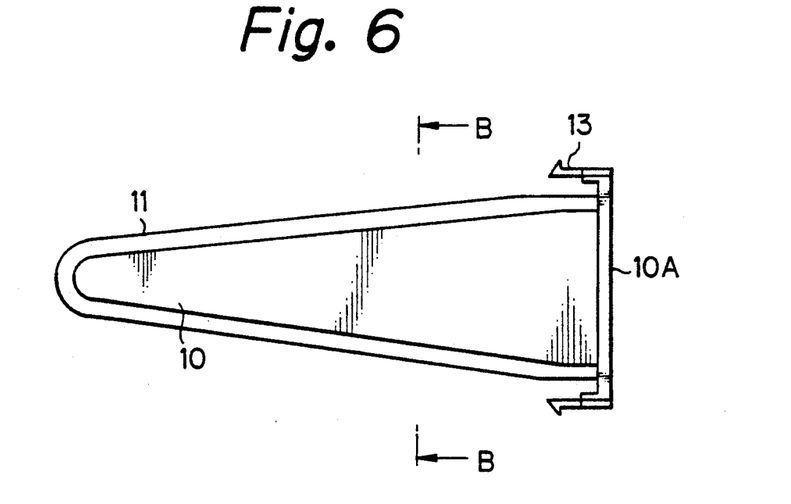
FIG. 6 is a front view associated with FIG. 5.
Figure 7:
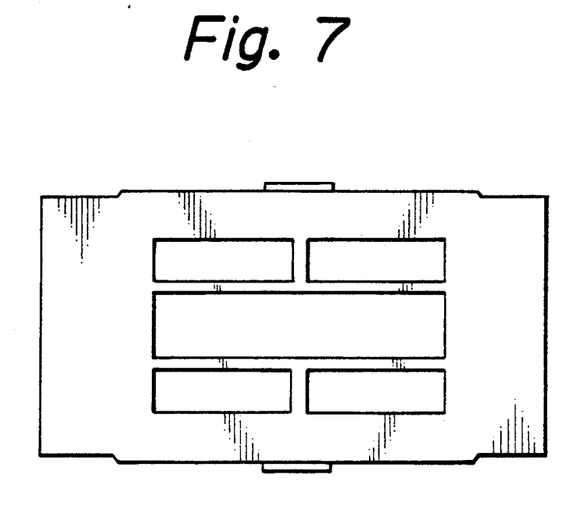
FIG. 7 is a side elevation as viewed from the right-hand side of FIG. 6.
Figure 8:
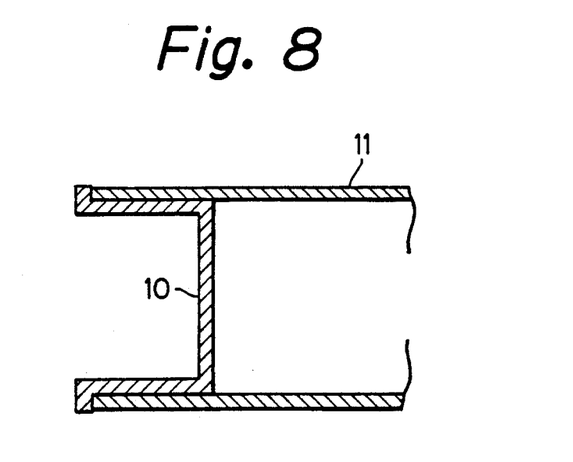
FIG. 8 is a fragmentary section along line B—B of FIG. 6.
Figure 16:
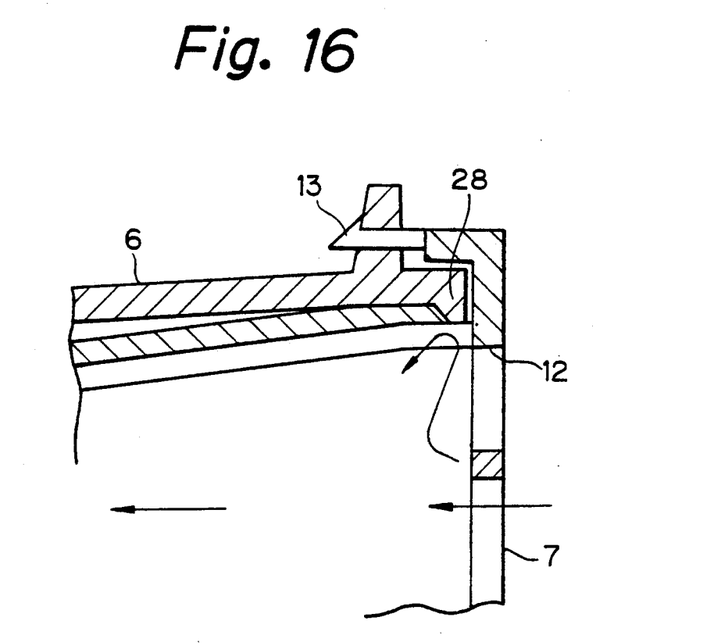
FIG. 16 shows a portion labeled F in FIG. 13 in detail.
Figure 17:
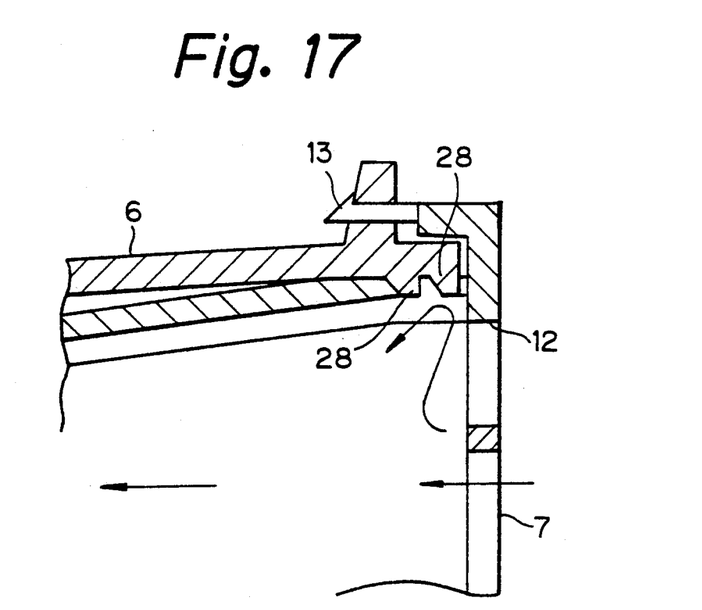
FIG. 17 is a fragmentary section showing an alternative configuration of an endless rail portion shown in FIG. 16.

Referring to FIG. 1 of the drawings, an air filtering device embodying the present invention is shown and incorporated in an optical disk drive 1 by way of example. As shown, the device is implemented as a filter 7. The optical disk drive 1 has a casing 3 accommodating an optical disk unit 5, a fan 4, and the filter 7. The fan 4 blows cooling air into the disk unit 5. The filter 7 is located at the suction side of the fan 4. A bottom plate 2 is attached to the bottom of the disk unit 1. The filter 7 is made up of a body in the form of a tube 6 having an air inlet at one end and an air outlet at the other end, and a removable filter pack 6A having a generally V-shaped section and having an opening thereof located at the same position as the inlet opening of the tube 6. As shown in FIGS. 5 and 6, the filter pack 6A has a flat filter mat 11 having a generally V-shaped section, frame members 10 located at opposite sides of the filter mat 11 which are parallel to the V-shaped section, and a frame member 10A affixed to the open end of the filter mat 11 for removably attaching the filter mat 11 to the tube 6. As shown in FIGS. 16 and 17, an endless projection or rail portion 28 extends from the inner periphery of the inlet end of the tube 6 toward the filter mat 11 of the filter pack 6A. A support portion 6B is formed at two positions on the inner periphery of the tube 6 along the filter frames 10, and it supports associated one of the frame members 10. Straight parallel ridges or rails 18 are included in the filter support portions 6B and extend in an intended direction of filter insertion.

In detail, the casing of the disk drive 1 is made up of the bottom plate 2 and panels 3a, 3b and 3c. The disk unit 5 loaded with the fan 4 and the tube 6 are disposed in the disk drive 1. The panel 3c is formed with an opening 8 through which the filter 7 is inserted into the disk drive 1. The panel 3a is formed with an opening 9. The disk unit 5 is inserted into the disk drive 1 via the opening 9 in such an orientation that the medium loading and unloading side of the disk unit 5 faces outward.

Figure 9:
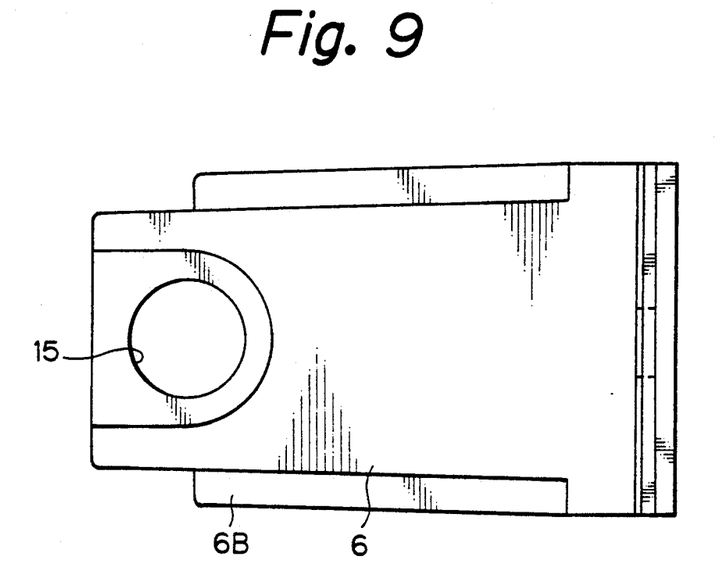
FIG. 9 is a plan view of the tube included in the embodiment.
Figure 10:
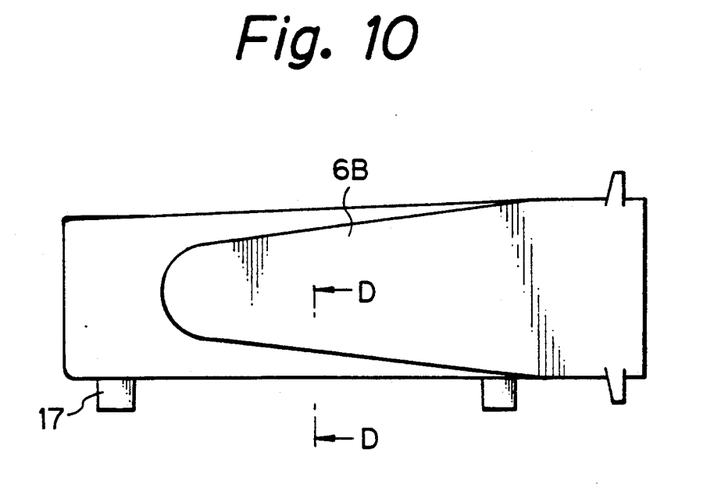
FIG. 10 is a front view associated with FIG. 9.
Figure 11:
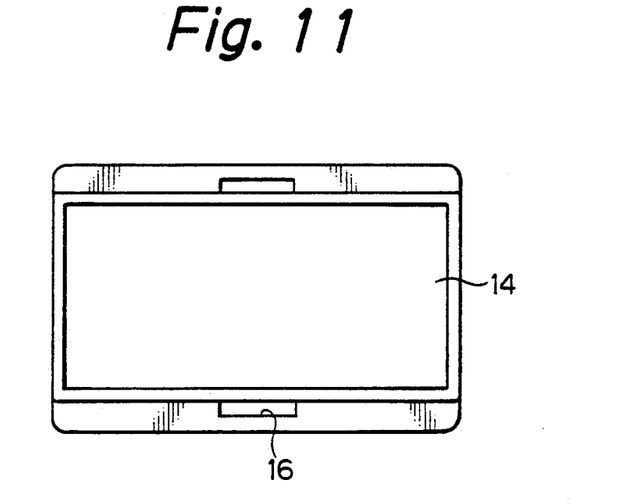
FIG. 11 is a side elevation as viewed from the right-hand side of FIG. 10.
Figure 12:
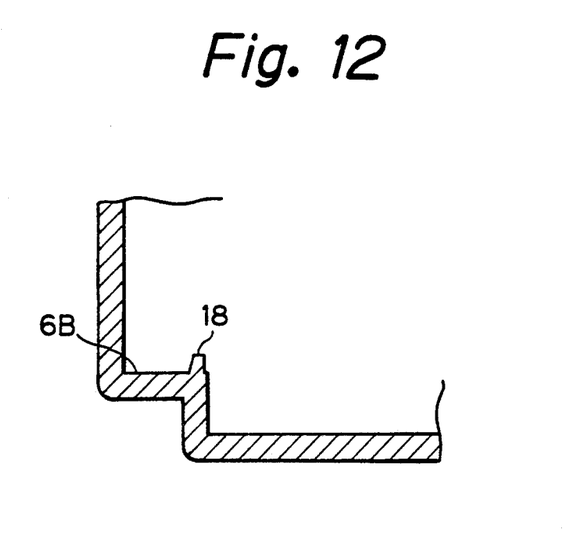
FIG. 12 is a fragmentary section along line C—C of FIG. 10.
Figure 13:
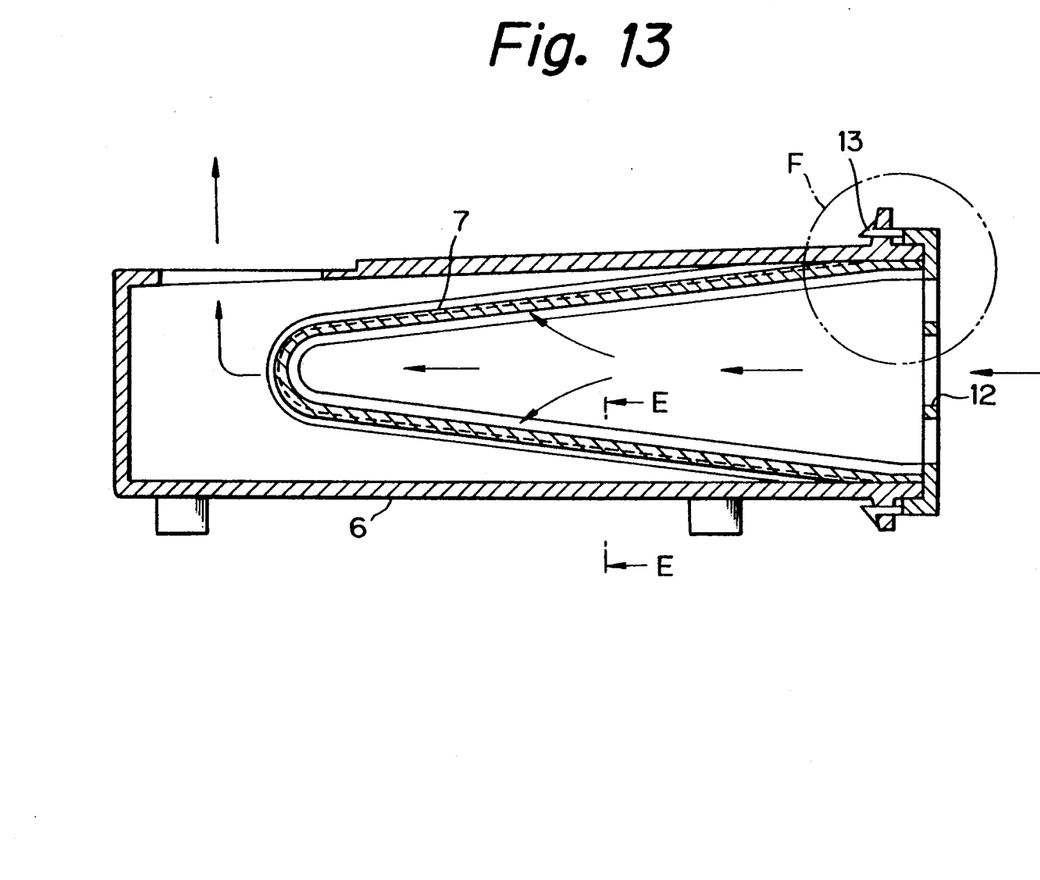
FIG. 13 is a section along line A—A of FIG. 12.

The filter 7 and tube 6 are used in a pair. In the filter 7, the filter frames 10 and filter mat 11 are connected together by heat at particular points C shown in FIG. 5. As shown in FIG. 13, the filter frames 10 are provided with an air inlet 12 and pawls 13 which are used to affix the filter frames 10 to the tube 6. On the other hand, as shown in FIGS. 9-11, the tube 6 is formed with a filter inlet opening 14, an air outlet 15, holes 16 for attaching the filter, and bosses 17 for mounting the bottom plate 2. Further, as shown in FIG. 12, a projection or rail 18 is provided on the inner periphery of the tube 6 for pressing the entire outer periphery of the end of the filter mat 11 when the filter 7 is inserted into the tube 6, thereby preventing unexpected air from entering the tube 6.

The disk unit 5 selectively records or reproduces data in or out of an optical disk medium. The fan 4 sucks air in a direction of the axis of rotation thereof and blows it out in a direction perpendicular thereto. The filter 7 removes dust and other impurities from incoming air. The tube 6 plays the role of a duct cover which isolates air purified by the assembly 7 from air existing in the disk drive 1, thereby preventing the purified air from being contaminated again. In this configuration, air sucked into the disk drive 1 by the fan 4 flows through the tube 6 to the inside of the disk unit 5, cools the disk unit 5, and then leaves the disk drive 1 via the medium insertion opening of the disk unit 5.

The filter 7 and tube 6 will be described more specifically with reference to FIGS. 13 and 14. Usually, the disk drive 1 is operated with the filter 7 received in the tube 6 which is affixed to the casing of the disk drive 1. Since the amount of dust which the filter 7 can collect is limited, the filter 7 has to be replaced periodically. The pawls 13 provide on the filter 7 allow the filter 7 to be readily removed from the tube 6. The stream of air purified by the filter 7 and exclusively used to cool the disk unit 5 has to be prevented from being mixed with surrounding air. For this purpose, in the portion where the filter 7 and tube 6 contact each other, the rail 18 of the tube 6 bite into laterally opposite end portions due to the flexibility of the filter mat 11.

Figure 14:
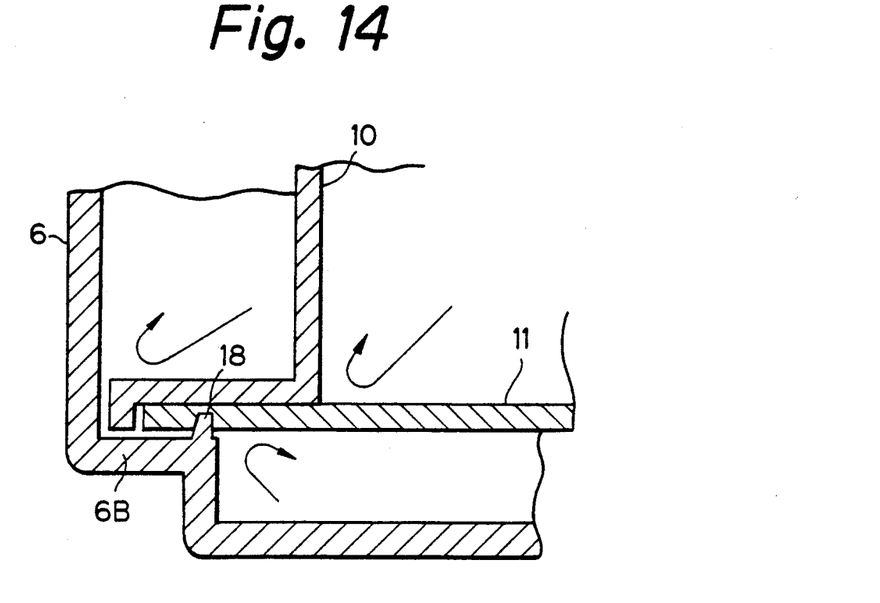
FIG. 14 is a fragmentary section along line E—E of FIG. 13.
Figure 15:
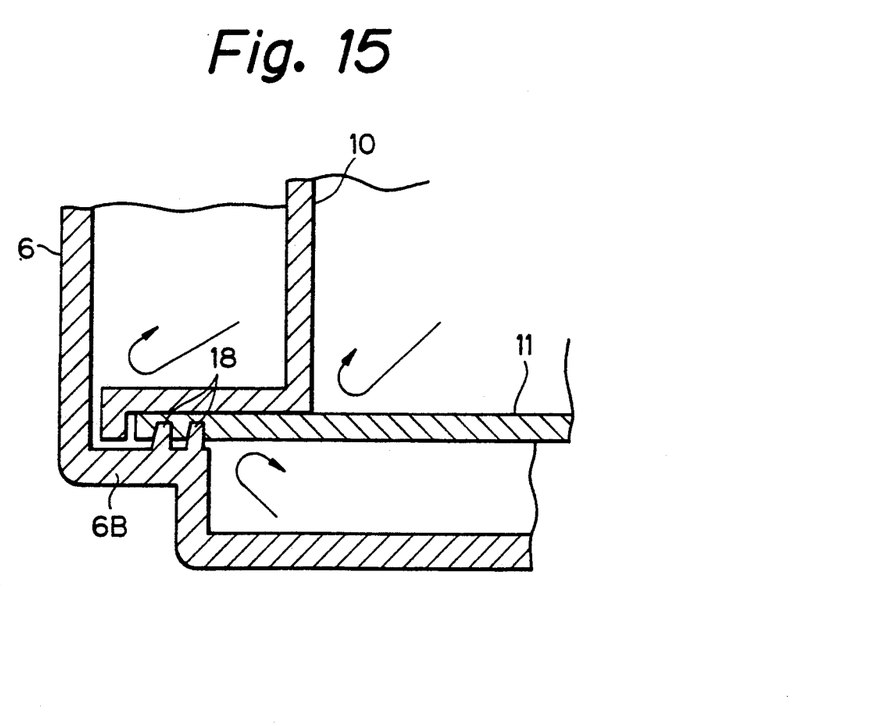
FIG. 15 is a fragmentary section showing an alternative configuration of a linear rail portion shown in FIG. 15.

Alternatively, as shown in FIGS. 13-15, plurality of projections or recesses 18 may be provided on the tube 6 to bite into laterally opposite end portions of the filter mat in the portion where the filter 7 and tube 6 contact each other. Further, as shown in FIGS. 13-17, a single or a plurality of rails 18 may be provided on the tube 6 to bite into all of the four end faces of the filter mat 11.

In summary, in an optical disk drive having a plurality of disk units which need cooling, an independent cooling structure is provided for the disk units which have to be cooled by purified air. An air filter has a generally V-shaped section to increase the filtering area of a filter mat. This enhances efficient dust collection and enhances the service life of the filter mat. In addition, the purified air is fully isolated from dust-containing air inside and outside of the casing of the disk drive by the combination of a rail and the flexibility of the filter mat.

Various modifications will become possible for those skilled in the art after receiving the teachings of the present disclosure without departing from the scope thereof.

What is claimed is:

1. An air filtering device comprising:
   a body having an air inlet at one end and an air outlet at the other end;
   a filter having a generally V-shaped section and removably set in said body with an opening thereof located at the same position as said air inlet of said body, said filter comprising a flat filter mat having a generally V-shaped section, filter frame members attached to opposite sides of said filter mat which are parallel to said V-shaped section, and a frame member affixed to said opening of said filter mat for allowing said filter mat to be removably attached to said body;
   an endless projection extending from inner periphery of said body adjacent to said air inlet toward said filter mat; and
   support portions provided on the inner periphery of said body for supporting said filter frame members.

2. A device as claimed in claim 1, wherein said endless projection comprises a pair of parallel endless projections.

3. A device as claimed in claim 1, wherein said filter frame members each has a generally U-shaped section and comprises a projection which bites into the V-shaped section of said filter mat.

4. An air filtering device comprising:
   a body having an air inlet at one end and an air outlet at the other end;
   a filter having a generally V-shaped section and removably set in said body with an opening thereof located at the same position as said air inlet of said body, said filter comprising a flat filter mat having a generally V-shaped section, filter frame members attached to opposite sides of said filter mat which are parallel to said V-shaped section, and a frame member affixed to said opening of said filter mat for allowing said filter mat to be removably attached to said body;
   an endless projection extending from inner periphery of said body adjacent to said air inlet toward said filter mat;
   a support member located at two positions in said body to extend along said filter frame members for supporting said filter frame; and
   a straight projection associated with said support members to extend in an intended direction of insertion of said filter.

5. A device as claimed in claim 4, wherein said straight projection comprises a pair of parallel projections.

* * * * *